United States Patent
Leysath

(10) Patent No.: US 6,979,105 B2
(45) Date of Patent: Dec. 27, 2005

(54) LIGHT DEVICE WITH PHOTONIC BAND PASS FILTER

(76) Inventor: Joseph A. Leysath, 12204 NE. 64th, Kirkland, WA (US) 98033

( * ) Notice: Subject to any disclaimer, the term of this patent is extended or adjusted under 35 U.S.C. 154(b) by 21 days.

(21) Appl. No.: 10/346,488

(22) Filed: Jan. 17, 2003

(65) Prior Publication Data

US 2003/0137845 A1      Jul. 24, 2003

Related U.S. Application Data

(60) Provisional application No. 60/350,266, filed on Jan. 18, 2002.

(51) Int. Cl.[7] .................................................. F21V 9/00
(52) U.S. Cl. ........................ 362/293; 362/235; 313/110; 257/10; 385/901
(58) Field of Search .............................. 362/293, 219, 362/235, 249, 800; 313/113, 110, 112, 498, 313/512; 257/10; 385/901, 140, 147

(56) References Cited

U.S. PATENT DOCUMENTS

| | | | | |
|---|---|---|---|---|
| 5,111,335 A | * | 5/1992 | Horiuti et al. ............... | 359/350 |
| 5,813,753 A | * | 9/1998 | Vriens et al. ................ | 362/293 |
| 5,831,382 A | * | 11/1998 | Bilan et al. .................. | 313/495 |
| 6,002,522 A | | 12/1999 | Todori et al. ................ | 359/573 |
| 6,040,936 A | | 3/2000 | Kim et al. ................... | 359/245 |
| 6,064,511 A | * | 5/2000 | Fortmann et al. ........... | 359/321 |
| 6,111,472 A | | 8/2000 | De Los Santos .............. | 331/96 |
| 6,132,072 A | * | 10/2000 | Turnbull et al. ............. | 362/494 |
| 6,142,647 A | * | 11/2000 | Hayakawa ................... | 362/230 |
| 6,307,527 B1 | * | 10/2001 | Youngquist et al. .......... | 345/39 |
| 6,339,030 B1 | * | 1/2002 | Constant et al. ............. | 438/758 |
| 6,520,654 B2 | * | 2/2003 | Angell et al. ................. | 362/23 |
| 6,586,775 B2 | * | 7/2003 | Hirayama .................... | 257/98 |
| 6,729,746 B2 | * | 5/2004 | Suehiro et al. .............. | 362/241 |
| 6,812,626 B2 | * | 11/2004 | Perlo et al. .................. | 313/316 |
| 2002/0051357 A1 | * | 5/2002 | Truttmann-Battig ......... | 362/92 |
| 2002/0114155 A1 | * | 8/2002 | Katogi et al. ................ | 362/219 |
| 2004/0070768 A1 | * | 4/2004 | McDaniel et al. ........... | 356/519 |

OTHER PUBLICATIONS

Yablonovitch, Eli, "Photonic Crystals: Semiconductors of Light," *Scientific American*, 285(6); pp. 47-55, Dec. 2001.

* cited by examiner

*Primary Examiner*—John Anthony Ward
*Assistant Examiner*—Jacob Y. Choi
(74) *Attorney, Agent, or Firm*—Seed IP Law Group PLLC

(57) ABSTRACT

A light fixture having a light reflector, a light source mounted on the reflector, and a photonic filter mounted on the reflector in a position such that light emitting directly from the light source and light from the lamp reflecting from the light source impinges on a surface of the filter, the filter configured to transmit therethrough light of a selected range of wavelengths and to attenuate light of wavelengths outside of the selected range. The light source may be a fluorescent lamp, an incandescent lamp, a HID lamp, or an LED, and may be one of a plurality of light sources. The filter may be formed in a semiconductor substrate and may have an LED light source formed in the same substrate and positioned such that the light produced propagates in a direction away from the filter and toward the reflector, where it is reflected back to the filter.

18 Claims, 8 Drawing Sheets

LIGHT DEVICE WITH PHOTONIC BAND PASS FILTER

CROSS-REFERENCE TO RELATED APPLICATION

This application claims the benefit of U.S. Provisional Patent Application No. 60/350,266 filed Jan. 18, 2002, where this provisional application is incorporated herein by reference in its entirety.

BACKGROUND OF THE INVENTION

1. Field of the Invention

The disclosed embodiments of the invention relate generally to a filter to be added to lighting fixtures and around light sources used for illumination purposes, and more particularly, to lighting fixtures and diode light sources used in buildings and transportation vehicles (i.e. automobiles, motorcycles, trains and planes) for the purpose of general illumination and accent illumination.

2. Description of the Related Art

General illumination in buildings and within transportation vehicles is primarily from lighting fixtures. These lighting fixtures use either fluorescent, incandescent or a HID lighting source.

When a lighting source lamp burns-out, it must be replaced. Typically a fluorescent lamp will need to be replaced every 15,000 hours, an incandescent lamp every 2000 hours, and a high intensity discharge (HID) lamp every 20,000 hours. Associated ballast replacement occurs every five years. The cost to conduct such maintenance and replacement can be expensive as well as disruptive to the occupants.

Lighting fixtures also deteriorate over time. Fixtures, and particularly metal fixtures, can be scraped or bent during maintenance or when an object strikes the fixture. This deterioration over time reduces fixture performance and fixture aesthetics.

Lighting fixture physical depth is critical in construction. Fixtures that encroach excessively into the cavity above the ceiling can interfere with construction of electrical and other systems.

In addition to maintenance, the cost of operating a fixture is tied directly to its energy use. Many municipalities also have restrictions on the amount of energy that can be allocated to general and accent illumination by lighting fixtures.

Light sources produce light at a specific range of wavelengths. Light at certain wavelengths is not desirable because it can shift the color of the object being viewed. In buildings true color (as viewed in sunlight) is the standard reference and thus the desirable color. The light produced by light emitting diodes (LED) is within a wide range of wavelengths. In many applications a specific range of light wavelengths is required for optimum performance, and present LED sources are unable to produce light in the specific range.

Another disadvantage of present LED designs is that LEDs are forward facing and the viewer can thus see the individual LED light sources. Typically these light sources appear as dots, which are not visually appealing and tend to not meet the criteria for illumination appearance desired by most users.

Thus it would be a great benefit to have a building lighting fixture that is virtually maintenance free, is resistant to deterioration of performance over its life span, has a shallow depth, has reduced power consumption, has a softer appearance and can adjust light to a specified range of wavelengths.

Replacing existing fixtures with fixtures containing color-corrected lamps can be quite expensive. In new construction providing fixtures containing color-corrected lamps can also be quite expensive. Color corrected lamps are available but the cost can be high for the lamp and in certain cases expensive for the special ballast needed to drive the color corrected lamp.

Thus there is a need for a filter that can either be added to the fixture and/or surround the lamp source to block undesirable wavelengths while allowing desirable wavelengths through.

The illumination source of transportation vehicle headlight fixtures and interior cab light fixtures is primarily by incandescent and HID lamps, and with limited use of fluorescent lighting. Transportation headlight fixtures are subject to deterioration caused by adverse environments such as rain, soot, and vibration. It would be advantageous to have transportation vehicle headlight fixtures and transportation vehicle interior cab light fixtures that are virtually maintenance free, resistant to deterioration of performance over the life span, have a softer appearance, and can adjust light to a specified range of wavelengths.

BRIEF SUMMARY OF THE INVENTION

In one embodiment of the invention, a light fixture is provided that includes a light reflector, a socket mounted on the reflector and configured to receive a lamp, and a photonic filter mounted on the reflector in a position such that light emitting directly from a lamp coupled to the socket and light from the lamp reflecting from the reflector impinges on a first surface of the filter, the filter configured to transmit therethrough light of a selected range of wavelengths and to attenuate light of wavelengths outside of the selected range.

According to one embodiment of the invention, the socket is configured to receive a fluorescent lamp.

According to another embodiment of the invention, the socket is configured to receive an incandescent lamp.

According to another embodiment of the invention, the socket is configured to receive a HID lamp.

According to a further embodiment of the invention, the socket is configured to receive a light emitting diode.

In accordance with yet another embodiment of the invention, a lighting device is provided that includes a photonic filter configured to pass a selected range of wavelengths, and to attenuate light of wavelengths outside of the selected range, an LED light source positioned on one side of the filter, and a reflector positioned in a spaced-apart relationship with the filter on the same side, such that light emanating from the light source in a direction away from the filter is reflected back to the filter.

According to a further embodiment of the invention, the filter and LED light source are formed concurrently in a semiconductor substrate.

In accordance with a method of providing a lighting device of the invention, the steps include forming, in a semiconductor substrate, a light emitting diode configured to produce light in a visible spectrum and to radiate the light away from a first surface of the substrate, forming in the semiconductor substrate a photonic band-pass filter configured to admit light through the substrate in a selected range of frequencies; and to attenuate light outside the selected range of frequencies; and mounting a reflector in spaced relationship with the substrate such that light produced by the light emitting diode is reflected back to the substrate.

BRIEF DESCRIPTION OF THE SEVERAL VIEWS OF THE DRAWING(S)

The foregoing embodiments of the invention will now be described with reference to the accompanying drawings, wherein.

DETAILED DESCRIPTION OF THE INVENTION

A photonic filter is made by forming holes in a substrate. The holes are sized and positioned to accommodate specific wavelengths of light, and to restrict other wavelengths. By controlling the shape, pattern, and frequency of the holes, as well as the material used, the behavior of light impinging on the filter may be controlled. A discussion of photonic crystals used in formation of photonic filters, "Photonic Crystals: Semiconductors of Light," may be found in the December 2001 issue of Scientific American, beginning on page 46.

Figure 1:
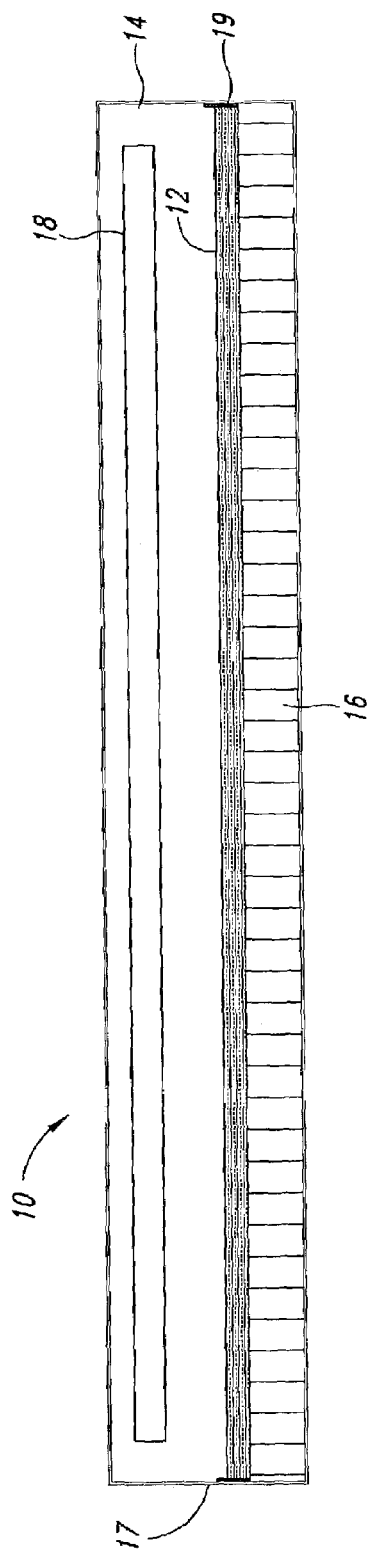
FIG. 1 is a cross-sectional side view of a fluorescent lighting fixture with a photonic band pass filter mounted on the housing in accordance with the present invention.

As shown in FIG. 1, a light device 10 having a photonic band pass filter 12 mounted to a fluorescent light fixture 14 is provided. The band pass filter 12 is mounted between a fluorescent tube 18 and an optional fixture lense 16. The photonic band pass filter 12 is attached to a fixture housing 17 with a standard connector tab 19.

Light from the fluorescent tube 18 shines through the photonic band pass filter 12. The filter 12 blocks the undesired specific wavelengths of light while the desired wavelengths are allowed to pass though the filter 12. The optional lens 16 diffuses the transmitted light as originally intended by the fixture manufacturer.

Figure 2:
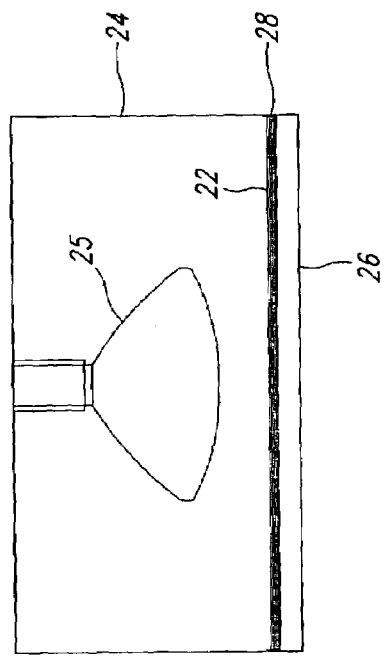
FIG. 2 is cross-sectional side view of an incandescent or a HID fixture with a photonic band pass filter mounted on the housing.

Referring to FIG. 2, an HID or incandescent light fixture 20 with a photonic band pass filter 22 is shown having the photonic band pass filter 22 mounted to a light fixture housing 24. The band pass filter 22 is located between a lamp source 25 and an optional fixture lens 26. The photonic band pass filter 22 is attached to the fixture housing 24 with a standard connector tab 28.

Light from the lamp source 25 shines through the photonic band pass filter 22. The filter blocks the undesired specific wavelengths of light while the desired wavelengths are allowed to transmit though the filter. The optional lens 26 diffuses the transmitted light as originally intended by the fixture manufacturer.

Figure 3:
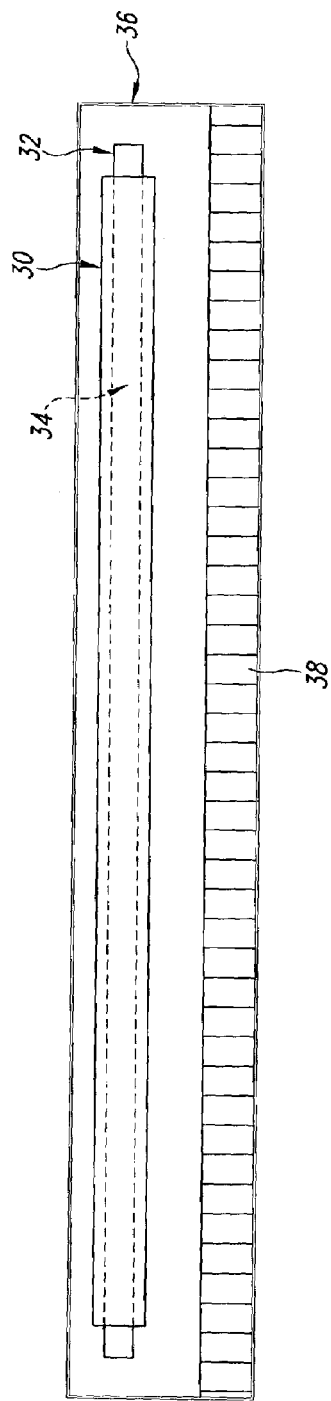
FIG. 3 is a side view illustration of a lamp directly surrounded by a photonic band pass filter.

FIG. 3 shows a photonic band pass filter 30 shaped in a similar fashion as a lamp source 32. The light-emitting portion 34 of the lamp source 32 is mounted within the photonic band pass filter 30 and the entire assembly is mounted within a pre-manufactured lighting fixture 36. An optional diffusion lens 38 may be mounted thereon as well.

Figure 4:
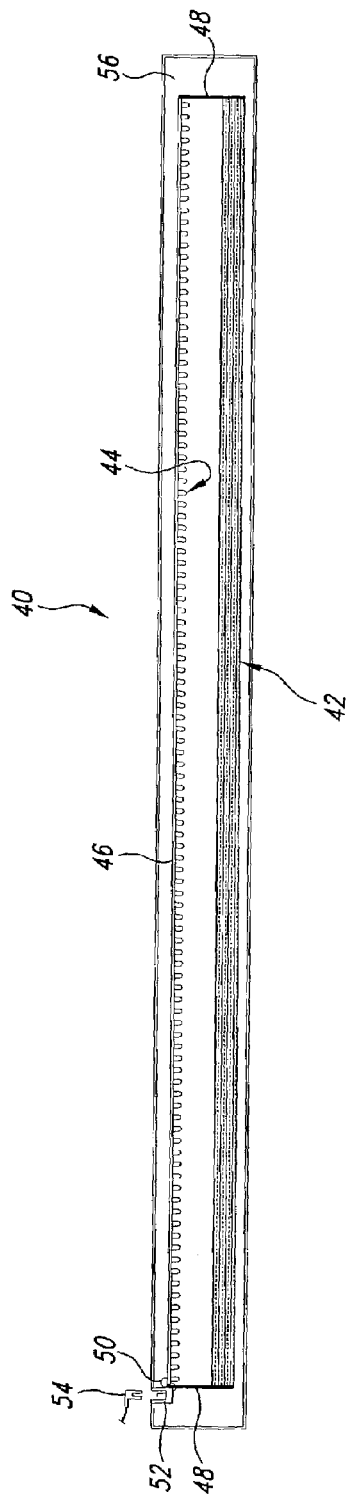
FIG. 4 is a cross-sectional side view of an LED lighting fixture with photonic band pass filter system formed in accordance with the present invention.

In FIG. 4, an LED light fixture 40 with a photonic band pass filter 42 is illustrated to include multiple LED's 44 mounted on a common circuit board (referred to as "LED assembly") 46. The photonic band pass filter 42 is positioned a specific distance from the LED's 44 to obtain optimum performance. The specific distance is determined in part by the wavelength of the light to pass therethrough while the other wavelengths are blocked. The photonic band pass filter 42 is fixed in place by supports 48 in a conventional manner. Wiring 50 from the LED assembly is connected to an electrical socket 52. The electrical socket 52 is rigidly connected to the LED assembly 46. The source of electricity is connected to the electrical socket 52 via an electrical plug 54. The entire assembly is encapsulated with a transparent encapsulate 56, such as transparent polymer.

Light from the LED assembly 46 passes through the photonic band pass filter 42 to present a softer appearance. The filter 42 is configured to allow only specific wavelengths of light to pass therethrough.

Figure 7:
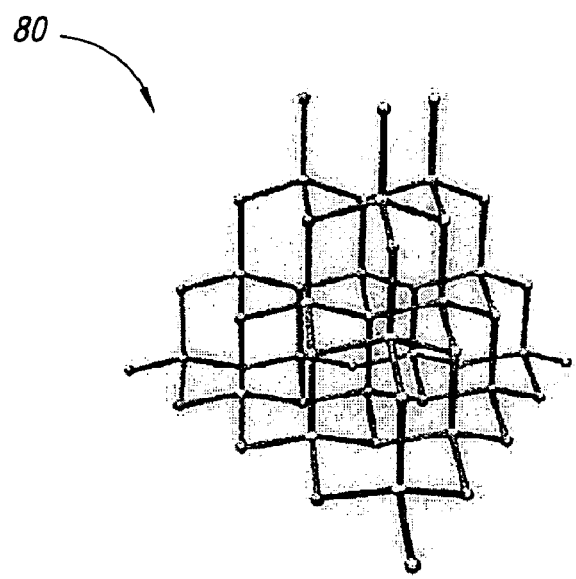
FIGS. 7–12 show representative structural configurations of photonic filters according to embodiments of the invention.
Figure 8:
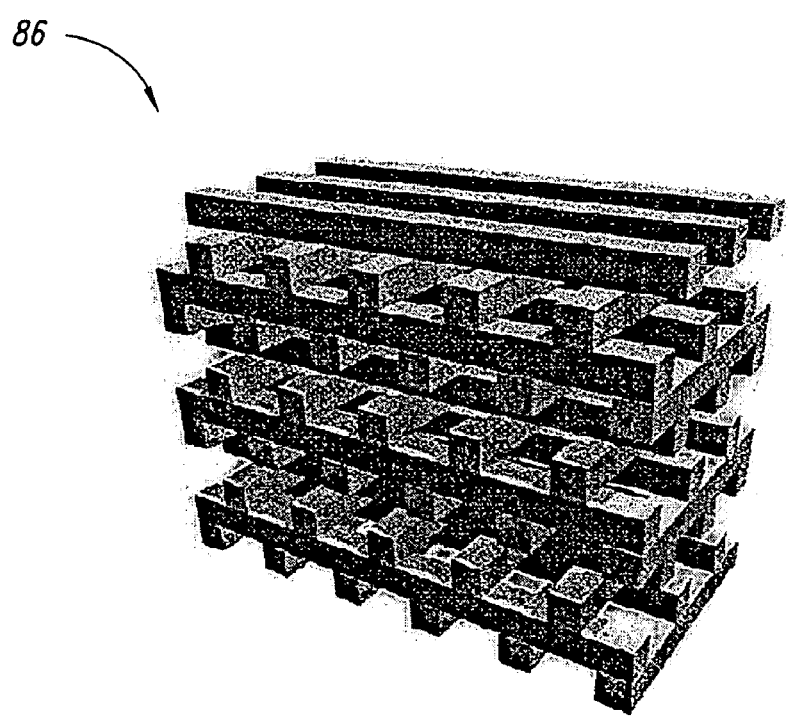

The photonic filter 80 may be constructed of a material formed with holes at a specific angle and diameter in a diamond tetrahedral configuration, as shown in FIG. 7. The size and specific angle of the holes is dictated by the wavelength of light to be passed therethrough. The filter allows certain wavelengths of light to pass while blocking other wavelengths of light. Other configurations may include:

A log style pattern 86, as shown in FIG. 8, in which a series of parallel, long notches are cut into a plate material and a series of plates are stacked on top of each other to obtain a log stack pattern.

Figure 9:
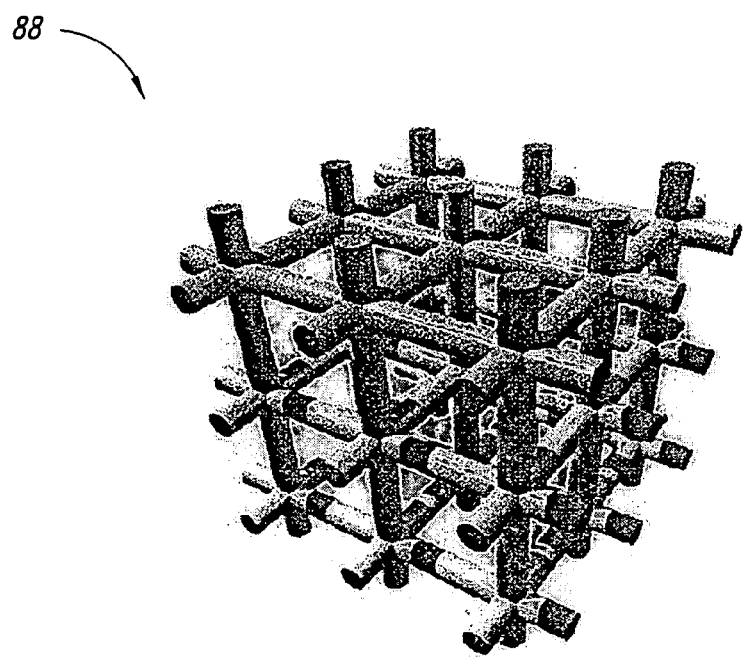

A scaffold pattern 88, as illustrated in FIG. 9, in which the cylinder-shaped material is arranged both vertically and horizontally.

Figure 10:
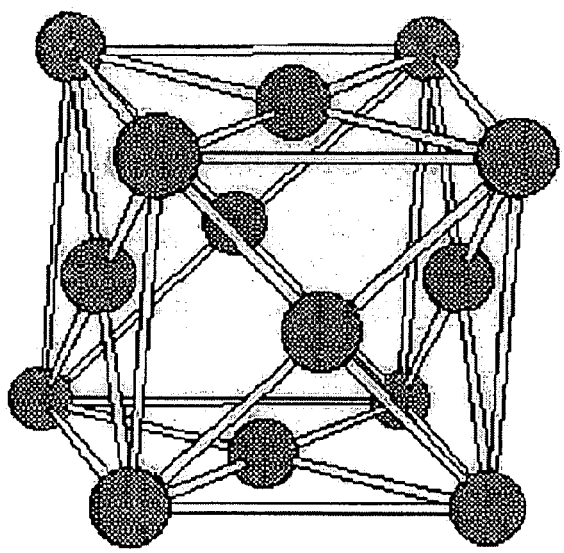

A face centered cubic pattern 90, as shown FIG. 10, or other known crystal structure.

Figure 11:
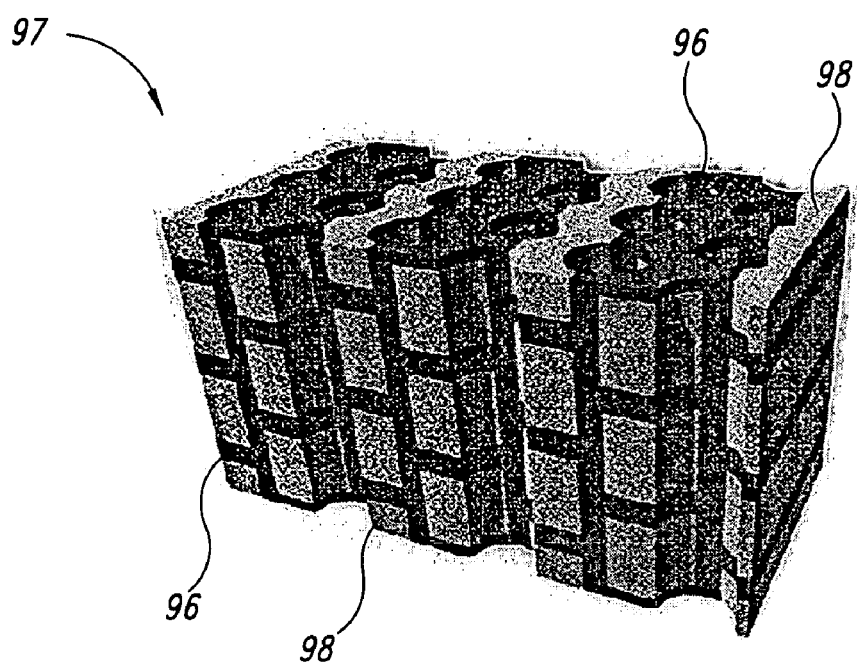

Another filter 92, as illustrated in FIG. 11, may consist of a semiconductor crystal 94 that uses silicon dioxide channels 96 in silicon 98.

Figure 12:
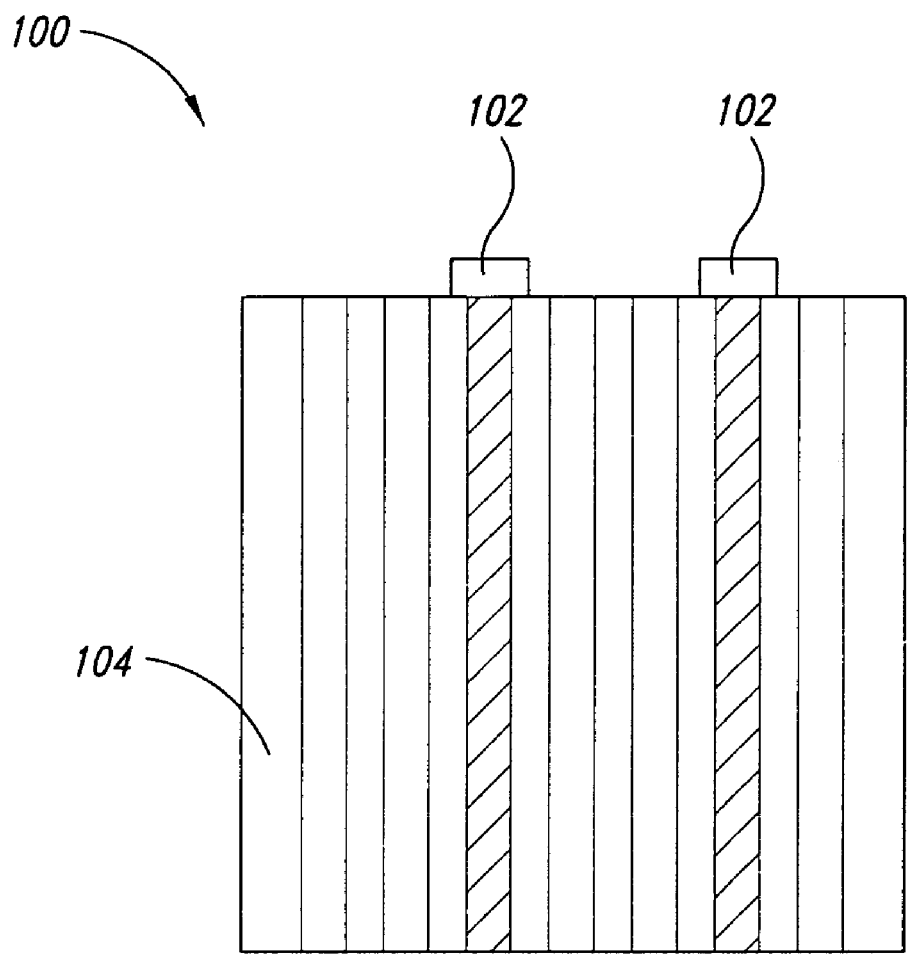

FIG. 12 illustrates a photonic filter 100 in which active devices 102 are formed in a semiconductor substrate 104 concurrently with the formation of the photonic filter to amplify desirable wavelengths of light.

Figure 5:
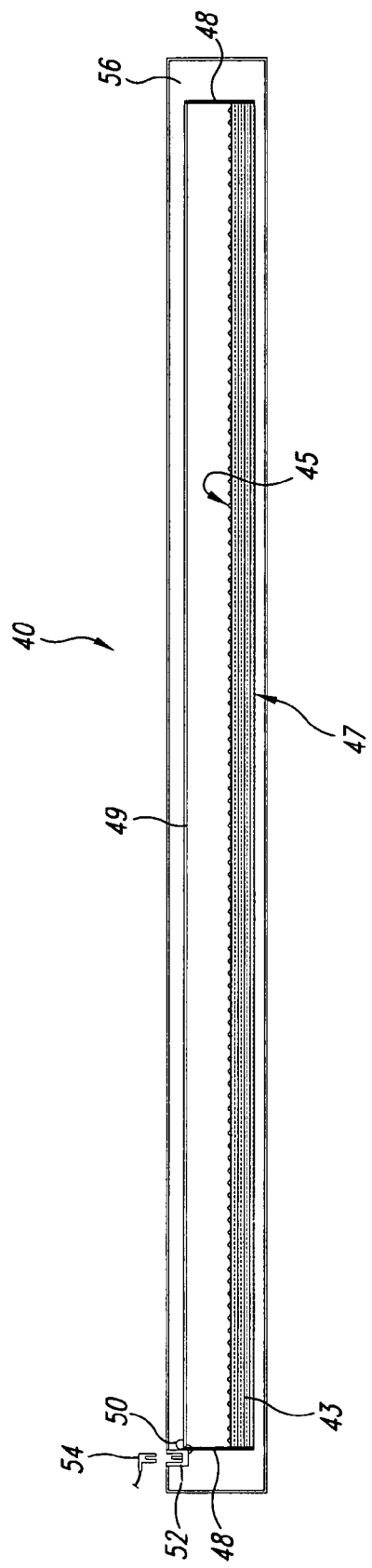
FIG. 5 is a cross-sectional side view of an LED lighting fixture with photonic band pass filter system formed in accordance with an embodiment of the present invention.

As illustrated in FIG. 5, light-emitting diodes 45 may be formed in a semiconductor substrate 43 concurrently with the formation of a photonic filter 47. In such an embodiment, the diodes 45 may be configured to radiate light in the direction of a reflector 49, which then reflects the light back to the substrate 43 where it passes through the filter 47. In this way, the substrate dissipates heat from the diodes while regulating the spectrum of light passing therethrough.

The filter can be formed of a material that can be drilled to the desired configuration or it can be a crystal with patterns matching the desired configuration. The filter material can be composed of either ceramic, silicon, glass, metal or a polymer or a combination thereof. For most applications polymer will be the preferred material.

Figure 6:
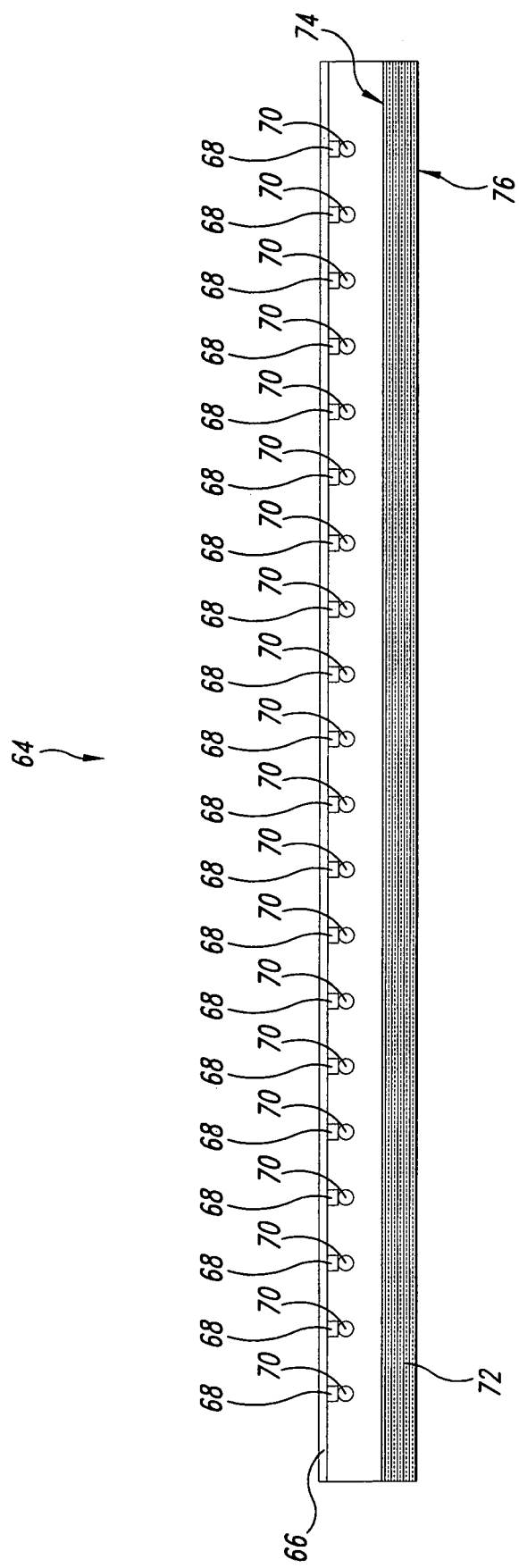
FIG. 6 is a cross-sectional side view of an LED lighting fixture with photonic band pass filter system formed in accordance with an embodiment of the present invention.

According to an embodiment of the invention, as illustrated in FIG. 6, a light fixture 64 is provided that includes a light reflector 66, at least one socket 68 mounted on the reflector 66 and configured to receive a lamp 70. The fixture 64 may include a plurality of sockets 68, each configured to receive a lamp 70. The lamp or lamps 70 may be any of a variety of types, including fluorescent, incandescent, HID, and LED.

A photonic filter 72 is mounted on the reflector 66 in a position such that light emitting directly from the lamps 70 coupled to the sockets 68 and light from the lamps 70 reflecting from the reflector 66 impinges on a first surface 74 of the filter 72. The filter is configured to transmit light of selected wavelengths therethrough to a second surface 76, and to attenuate light of non-selected wavelengths.

Descriptions of various materials and methods of manufacture of photonic devices may be found in the following patents: U.S. Pat. No. 6,002,522, issued to Todori, et al on Dec. 14, 1999; U.S. Pat. No. 6,040,936, issued to Kim, et al on Mar. 21, 2000; U.S. Pat. No. 6,064,511, issued to Fortmann, et al on May 16, 2000; and U.S. Pat. No. 6,111,472, issued to De Los Santos on Aug. 29, 2000.

With respect to the structure and behavior of photonic devices, some of the teachings of the above incorporated patents are presented herebelow.

We have recognized that structured materials for photonic devices, at wavelengths of X-ray, ultraviolet, visible, infrared and microwave radiation, can be made using layer growth techniques. In a resulting structured material, the refractive index varies. . . . Such structures can interact with electromagnetic radiation, e.g. by selective transmission or reflection, with selectivity being a function of wavelength and/or angle of propagation. The structures can be used as selective bandpass filters, . . . for example.

U.S. Pat. No. 6,064,511, issued to Fortmann, et al.

The photonic band is formed by periodically arranging two or more different substances having different refractive indices, and a medium that forms the photonic band is called a photonic crystal. . . . Under a certain condition, a region where no light can exist is observed like an energy gap of a semiconductor. Such region is called a photonic band gap. In the photonic crystal, specific transmission spectrum, absorption spectrum, and reflection spectrum are observed. These spectra change depending on the arrangement of the substances constituting the photonic crystal and upon changes in refractive index of these substances.

U.S. Pat. No. 6,002,522, issued to Todori, et al.

A photonic bandgap crystal is a periodic, or nearly periodic, structure that supports the propagation of electromagnetic radiation except at certain bandgap frequencies.

The photonic bandgap crystal retains its inherent filtering properties and therefore, one skilled in the art would recognize that the present invention is an "active" photonic crystal.

U.S. Pat. No. 6,111,472, issued to De Los Santos.

While preferred embodiments of the invention have been illustrated and described, it is to be understood that other changes may be made without departing from the spirit and scope of the invention. For example, while a transparent polymer may be used as the encapsulate, other similar materials can be used or materials having similar properties. A transparent epoxy can also be used as the encapsulate.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A light fixture, comprising:
    a light reflector;
    a socket mounted on the reflector and configured to receive a lamp;
    a photonic filter mounted on the reflector in a position such that light emitting directly from a lamp coupled to the socket and light from the lamp reflecting from the reflector impinges on a first surface of the filter, the filter configured to transmit therethrough to a second surface, light of a selected range of wavelengths and to attenuate light of wavelengths outside of the selected range.

2. The light fixture of claim 1 wherein the socket is configured to receive a fluorescent lamp.

3. The light fixture of claim 2 wherein the reflector and filter each have an elongated shape.

4. The light fixture of claim 1 wherein the socket is configured to receive an incandescent lamp.

5. The light fixture of claim 1 wherein the socket is configured to receive a light emitting diode.

6. The light fixture of claim 1 wherein the socket is configured to receive a HID lamp.

7. The light fixture of claim 1 wherein the socket is one of a plurality of sockets mounted on the reflector, each configured to receive a lamp, and wherein the filter is sized and configured such that light emitting directly from lamps coupled to respective ones of the plurality of sockets and light from the lamps reflecting from the reflector impinges on the first surface of the filter.

8. A lighting device, comprising:
    a photonic filter configured to pass selected wavelengths of light and to attenuate light of non-selected wavelengths;
    an LED light source mounted on the filter; and
    a reflector positioned in spaced-apart relationship with the filter and configured to reflect back to the filter light emanating from the light source in a direction away from the filter.

9. The device of claim 8 wherein the LED light source is configured such that a greater part of the light produced from the light source propagates in a direction away from the filter and toward the reflector.

10. The device of claim 9 wherein the LED light source and the photonic filter are manufactured concurrently on a common semiconductor substrate.

11. The device of claim 8 wherein the LED light source is one of a plurality of LED light sources positioned on the one side of the filter.

12. The lighting device of claim 8 wherein the photonic filter is a bandpass filter.

13. The lighting device of claim 8 wherein the photonic filter is a bandgap filter.

14. A method, comprising:
    forming, in a semiconductor substrate, a light emitting diode configured to produce light in a visible spectrum and to radiate the light away from a first surface of the substrate;
    forming, in the semiconductor substrate; a photonic filter; and
    mounting a reflector in a spaced-apart relationship with the substrate, such that light produced by the light emitting diode is reflected back to the substrate.

15. The method of claim 14, further comprising mounting a light diffuser on a side of the substrate opposite the reflector to diffuse light passing through the substrate.

16. The method of claim 14 wherein the forming a photonic filter step comprises forming, in the semiconductor substrate, a photonic band-pass filter configured to admit light through the substrate in a selected range of wavelengths and to attenuate light outside the selected range of wavelengths.

17. A method, comprising:
generating light in an active device formed on a substrate;
filtering the light through a photonic filter also formed on the substrate;
drawing heat generated by the active device into the substrate; and
reflecting the light toward the filter, employing a reflector spaced apart from the active device and the substrate.

18. A lighting device, comprising:
a photonic filter;
an LED light source positioned on the filter; and
a reflector positioned in spaced-apart relationship with the filter to reflect back to the filter light emanating from the light source in a direction away from the filter.

* * * * *

UNITED STATES PATENT AND TRADEMARK OFFICE
CERTIFICATE OF CORRECTION

PATENT NO. : 6,979,105 B2
APPLICATION NO. : 10/346488
DATED : December 27, 2005
INVENTOR(S) : Joseph A. Leysath It is certified that error appears in the above-identified patent and that said Letters Patent is hereby corrected as shown below:

Column 6
Lines 51-52, "sources positioned on the one side of the filter" should read as --sources mounted on the filter--

Signed and Sealed this

Twenty-second Day of August, 2006

JON W. DUDAS
*Director of the United States Patent and Trademark Office*